Patented Jan. 30, 1951

2,539,685

UNITED STATES PATENT OFFICE 2,539,685

DIAMINE-FATTY ACID SALTS

Seaver A. Ballard, Orinda, and Vernon E. Haury, Simi, Calif., assignors to Shell Development Company, San Francisco, Calif., a corporation of Delaware No Drawing. Application January 11, 1949, Serial No. 70,365

9 Claims. (Cl. 260—404.5)

This invention relates to a new class of organic compounds which are capillary-active agents possessing valuable wetting, foaming, emulsifying and related properties. More particularly the invention relates to salts of diamines with fatty acids.

In U. S. Patent No. 2,402,495 we disclose novel capillary-active compounds which are salts of higher fatty acids with amino alcohols or amino ketones wherein the amino radical is attached to a carbon atom which is separated by another carbon atom from the

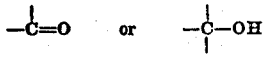

group, representative salts of this type being diacetone-alkamine stearate and diacetonalkamine oleate.

It has now been discovered that the novel class of capillary-active compounds comprising salts of fatty acids with diamines possesses valuable wetting, foaming and emulsifying properties which in many cases are superior to those of the compounds described in our aforesaid patent.

The diamines which are suitable for use in forming the salts of the present invention are characterized by having the amino nitrogen atoms attached to carbon atoms which are separated from one another by a third carbon atom, said diamines having the following characteristic structure:

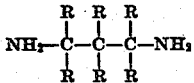

wherein the R's are selected from the group consisting of the hydrogen atom and hydrocarbon radicals, whether substituted or not, and preferably the R's are members of the group consisting of the hydrogen atom and alkyl, including cycloalkyl, radicals. Instead of having the open chain structure shown in the preceding formula the diamines may be cyclic in character, representative useful cyclic compounds being 1,3-diaminocyclohexane and 4-amino-2,2,6,6-tetramethylpiperidine. The amino radicals may also have one or more of their hydrogen atoms substituted by other radicals. Further, the hydrocarbon radicals may, if desired, be substituted by any suitable atom or radical such as a halogen atom, nitro radical, or the like.

A more preferred sub-class of diamine compounds for use in forming the salts of this invention is that having the structural formula

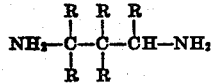

wherein the R's are alkyl radicals which may, if desired, be cyclic in character. It will be observed that the compounds in this preferred class of diamines are those wherein one of the amino nitrogen atoms is attached to a tertiary carbon atom and the other to a secondary carbon atom once removed from the tertiary carbon atom. Representative compounds falling within this preferred group are:

2,4-diamino-4-methylpentane
3,5-diamino-3-methylheptane
2,4-diamino-2,3-dimethylpentane
2,4-diamino-3-ethyl-2-methylpentane
2,4-diamino-2-ethylhexane
3,4-dimethyl-2,4-diaminohexane
2,4-diamino-2-methylhexane
2,4-diamino-2-methylpentane
2,4-diamino-2-methyl-3-cyclohexylpentane
2,4-diamino-2-cyclohexylpentane The preferred compound within this more preferred sub-class is 2,4-diamino-4-methylpentane, hereinafter referred to as diacetonediamine. The foregoing diamines may be prepared in any desired manner, a preferred preparation being that described in co-pending application, Serial No. 736,610, filed March 24, 1947, by Vernon E. Haury, Patent No. 2,486,648, issued November 1, 1949. According to that method diacetonediamine is prepared by reacting 2,2,4,4,6-pentamethyltetrahydropyrimidine with hydrogen and ammonia, and the other diamines may be prepared in like manner from related pyrimidine compounds.

Other representative diamines which may be employed in forming the salts of the present invention are:

1,3-diamino-3-methylbutane
1,3-diamino-3-methylhexane
1,3-diamino-3-ethylpentane
1,3-diamino-2,3-dimethylbutane
2,4-diaminopentane
2,4-diaminoheptane
2,4-diamino-3-methylhexane
1,3-diaminobutane
1,3-diaminocyclohexane
1,3-diamino-2-ethylbutane
1,3-diamino-2-methylhexane
Trimethylene diamine
1,3-diamino-2-ethylpropane
1,3-diamino-2-(2-methylcyclopentyl)propane
4-amino-2,2,6,6-tetramethylpiperidine
2,4-diamino-2,4-dimethylpentane
3,5-diamino-3,5-dimethylheptane
2,4-diamino-2,4-dimethyl-3-ethylpentane The capillary-active salts of the present invention include those wherein either one or both of the amino groups in the diamine are attached to a fatty acid, though the diacid salts are preferred, i. e. those wherein both amino groups are fatty acid-linked. Further, a mixture of fatty acids may be used; that is to say, the respective amino nitrogen atoms in the diamine molecule may be linked to different fatty acids. While lower fatty acids such as acetic, n-butyric, caproic, and n-heptylic acids may be used, it is preferred that at least one of the amino nitrogen atoms in the salt be linked to a higher fatty acid, which latter term is employed herein to designate any saturated or unsaturated fatty acid having a minimum of 8 carbon atoms in the molecule. Representative higher fatty acids of this type are caprylic, nonylic, capric, undecylic, lauric, tridecoic, myristic, pentadecoic, palmitic, margaric, stearic, nondecoic, arachidic, heneco-soic, behenic, tricosanic, lignoceric, pentacosanic, cerotic, carboceric, octacosanic, montanic, melissic, psyllic and oleic acids. Among the higher fatty acids, those of the monocarboxylic type are preferred.

Representative capillary-active salts of the present invention are diacetonediamine dioleate, diacetonediamine distearate, diacetonediamine mono-oleate, diacetonediamine monostearate, the mixed salt of diacetonediamine with acetic and oleic acids, 3,5-diamino-3-methylheptane dioleate, 2,4-diamino-2,3-dimethylpentane dicaprillate, 2,4-diamino-3-ethyl-2-methylpentane dilaurate, 2,4-diamino-2-ethylhexane distearate, 3,4-dimethyl-2,4-diaminohexane monopalmitate, the mixed salt of 2,4-diamino-2-methylhexane with oleic and stearic acids, and the mixed salt of diacetonediamine with oleic and stearic acids.

The amine salts of the present invention may be formed in any known manner. The preferred method of preparation involves the simple addition of the diamine and fatty acid reactants without the splitting out of any component, this addition being effected by bringing the representative reactants together in the liquid phase and in the desired molecular proportions. In the case of the diacid salts, the correct molecular proportion will be 2 moles of the acid for each mole of diamine, though with mono-acid salts wherein only one of the amino groups is to be linked to a fatty acid, equi-molar proportions of the acid and diamine reactants should be used. Thus, diacetonediamine dioleate or trimethylene diamine dioleate are formed by melting together oleic acid and the corresponding diamine in the proportion of 2 moles of acid for each mole of diamine. The product formed is made up almost entirely of the desired salt which may then either be used as such or subjected to a preliminary purification treatment. These salts have the ability to act as anion-active capillary agents in aqueous media and may be added directly to the wetting solutions. Alternatively, the salt may be formed in the latter solution by adding thereto the correct molecular proportions of acid and diamine, these reactants being added either together or separately.

The salts of the present invention may be used, for example, in treating baths containing an aqueous medium either with or without the addition of other substances such as mordants, dyes, color-reducing agents or other materials of the type commonly used in such baths, and the resulting solution may then be employed with excellent results wherever interface modification or wetting-out action is desired. Thus, for example, solutions of this type are usefully employed in the dyeing, bleaching, and scouring of fabrics, the stuffing of leather, the dyeing of furs, and the flotation of ores. The salts of the invention may also be employed with effective results in various cosmetic preparations.

The superior emulsification, foaming and wetting properties of the amine salts of the present invention are illustrated, in part, by the following examples:

EXAMPLE I

There were prepared 1% aqueous solutions of diacetonediamine dioleate, diacetonediamine mono-oleate, diacetonediamine distearate and trimethylenediamine dioleate, the same being representative salts of the present invention. Fifty ml. portions of these solutions were then shaken with 50 ml. of Maxim oil No. 13 in a 100 ml. graduating mixing cylinder for one minute thereby forming 100 ml. of emulsion. The cylinder was then placed in a constant temperature bath and the volume of the upper phase (representing the emulsion) was recorded at the end of one hour. Similar tests were made with some hitherto accepted capillary agents, and the comparative results are shown in the following table:

Table I

| Test Compound | Volume of emulsion remaining after one hour |
| --- | --- |
| Diacetonediamine dioleate | 100 |
| Trimethylenediamine dioleate | 98 |
| Diacetonediamine mono-oleate | 88 |
| Hexamethylenediamine dioleate | 83 |
| 2-amino-2-methyl-1-propanol oleate | 82 |
| Sodium oleate | 65 |
| Diacetonealkamine oleate | 68 |

EXAMPLE II

In another test the foaming properties of these new amine salts were compared with those of other known capillary agents. These tests were made by placing 50 ml. of a 0.1% aqueous solution of the compound under test in a 120 ml. graduated mixing cylinder, shaking the solution for one minute, and then placing it in an oven maintained at 25° C. where readings of the liquid volume were made every minute for 30 minutes. The "foaming power" is taken as the average volume of the liquid, expressed in per cent, existing as foam during the first 3 minutes. The "foam stability" is the average volume of the liquid, expressed in per cent, existing as foam during the last 10 minutes of the test.

The following table shows the results obtained with the various test compounds:

Table II

| Test Compound | Foaming Power | Foam Stability |
| --- | --- | --- |
| Diacetonediamine distearate | 12 | 3 |
| Monoethanolamine stearate | 3.1 | 2.2 |
| Diethanolamine stearate | 2.9 | 2.5 |
| Triethanolamine stearate | 0.2 | 0 |
| Morpholine stearate | 0.2 | 0 |

The invention claimed is:

1. The addition salt of a fatty acid with a diamine compound, said diamine compound being characterized by having its amino nitrogen atoms linked to carbon atoms separated from one another by a third carbon atom.

2. A diamine-fatty acid salt wherein at least one of the amino nitrogen atoms in the diamine is attached to a higher fatty acid, said diamine being characterized by having its amino nitrogen atoms linked to carbon atoms separated from one another by a third carbon atom.

3. A fatty acid-diamine salt wherein at least one of the amino nitrogen atoms is attached to a higher fatty acid, said diamine being characterized by the presence of an amino group attached to a tertiary carbon atom removed by a carbon atom from a secondary carbon atom to which the other of the amino groups is attached.

4. The addition salt of a higher fatty acid and diacetonediamine.

5. The addition salt of stearic acid and diacetonediamine.

6. The addition salt of oleic acid and diacetonediamine.

7. Diacetonediamine mono-oleate.
8. Diacetonediamine dioleate.
9. Diacetonediamine distearate.

SEAVER A. BALLARD.
VERNON E. HAURY.

REFERENCES CITED

The following references are of record in the file of this patent:

UNITED STATES PATENTS

| Number | Name | Date |
| --- | --- | --- |
| 2,419,040 | Johnson | Apr. 22, 1947 |
| 2,450,940 | Cowan | Oct. 12, 1948 |